United States Patent
Kang

(10) Patent No.: US 7,873,777 B2
(45) Date of Patent: Jan. 18, 2011

(54) FLASH MEMORY SYSTEM, HOST SYSTEM FOR PROGRAMMING THE FLASH MEMORY SYSTEM, AND PROGRAMMING METHOD THEREOR

(75) Inventor: Shin-wook Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 11/698,133

(22) Filed: Jan. 26, 2007

(65) Prior Publication Data

US 2007/0288688 A1 Dec. 13, 2007

(30) Foreign Application Priority Data

Jun. 12, 2006 (KR) ...................... 10-2006-0052589

(51) Int. Cl.
*G06F 12/02* (2006.01)
(52) U.S. Cl. ...................... 711/103; 711/157
(58) Field of Classification Search ........................ None
See application file for complete search history.

(56) References Cited

U.S. PATENT DOCUMENTS

| 6,026,465 | A | 2/2000 | Mills et al. |
| 7,010,652 | B2 * | 3/2006 | Piccirillo et al. ............. 711/157 |
| 7,065,126 | B2 * | 6/2006 | Reznik et al. ................ 375/130 |
| 7,089,379 | B1 * | 8/2006 | Sharma et al. ............... 711/154 |
| 2004/0256638 | A1 | 12/2004 | Perego et al. |
| 2005/0223158 | A1 | 10/2005 | See et al. |

* cited by examiner

*Primary Examiner*—Gary J Portka
(74) *Attorney, Agent, or Firm*—Sughrue Mion, PLLC

(57) ABSTRACT

Provided are a multi-channel flash memory system capable of increasing the overall bandwidth by using a plurality of flash memory chips, and a programming method performed in the flash memory system. The flash memory system includes: a plurality of channel units each including at least two flash memory chips, a control unit which controls the flash memory chips, and a buffer unit which stores external data; and a host interface unit which transmits data separated according to the number of the channel units and transmitted by a host to the buffer units of the channel units, wherein the control unit records the data stored in the buffer unit into the at least two flash memory chips.

11 Claims, 11 Drawing Sheets

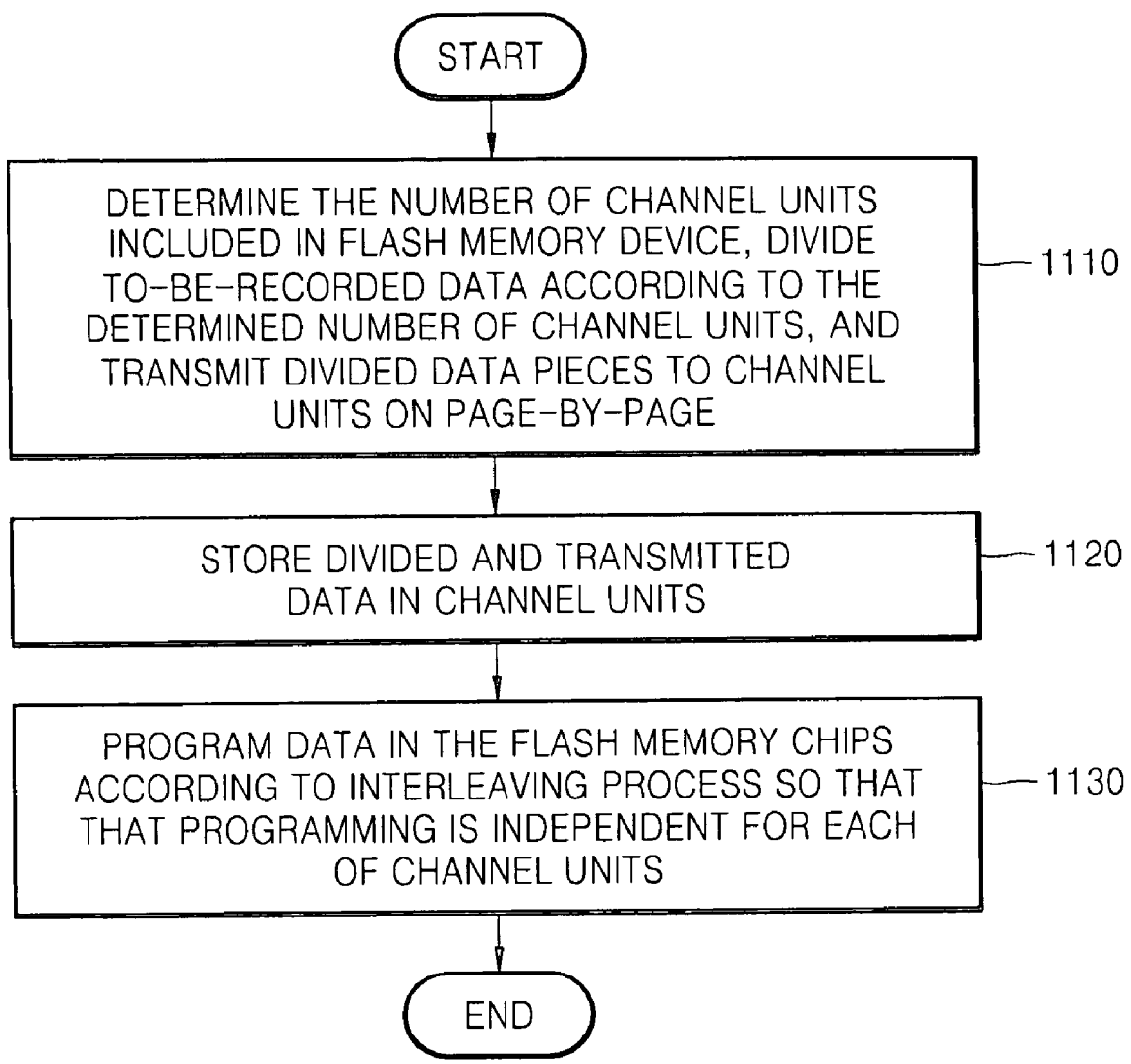

FLASH MEMORY SYSTEM, HOST SYSTEM FOR PROGRAMMING THE FLASH MEMORY SYSTEM, AND PROGRAMMING METHOD THEREOR

CROSS-REFERENCE TO RELATED PATENT APPLICATION

This application claims priority from Korean Patent Application No. 10-2006-0052589, filed on Jun. 12, 2006, in the Korean Intellectual Property Office, the disclosure of which is incorporated herein in its entirety by reference.

BACKGROUND OF THE INVENTION

1. Field of the Invention

Systems and methods consistent with the present invention relate to a memory device, and more particularly, to a multi-channel flash memory system using a plurality of flash memory chips, the system capable of increasing the overall bandwidth by storing to-be-recorded data independently for each channel according to an interleaving process, a host system providing the to-be-recorded data to the flash memory system, and a programming method performed by the host system and the flash memory system.

2. Description of the Related Art

Flash memories, which are non-volatile memories capable of electrically deleting or re-recording data, are classified into a NOR type and a NAND type according to how cells and bitlines are connected to each other.

NAND flash memories, which are storage areas for storing information, include memory cell arrays. A memory cell array includes a plurality of cell strings (which are also called NAND strings). In order to store data in a memory cell array of a flash memory or read data therefrom, the flash memory is provided with a page register circuit. As is well known to those of ordinary skill in the art, memory cells of a NAND flash memory are erased and programmed using a Folwer-Nordheim (F-N) tunneling current.

In order to store data in the memory cell array of the flash memory, first, a write command is given to the flash memory, and addresses and data are consecutively input to the flash memory. Generally, data, which is to be programmed, is sequentially transmitted to a page register circuit on a byte-by-byte basis or on a word-by-word basis. When the to-be-programmed data corresponding to one page of data is completely loaded to the page register circuit, data preserved in the page register circuit is programmed simultaneously in the memory cell array (i.e., memory cells of a selected page) according to a programming command.

In the related art, in order to increase the storage capacity of a flash memory, a multi-channel flash memory system using a plurality of flash memory chips has been proposed.

FIG. 1 is a block diagram of a configuration of a related art 2-channel flash memory system 20 using a plurality of flash memory chips. Referring to FIG. 1, the related art 2-channel flash memory system 20 includes a host interface unit 21 receiving to-be-recorded data by means of communication with a host 10, first and second buffers 22 and 23 storing received data, a control unit 24, and first through fourth flash memory chips 25, 26, 27, and 28. The first and second flash memory chips 25 and 26 constitute a first channel unit CH1, and the third and fourth flash memory chips 27 and 28 constitute a second channel unit CH2.

FIG. 2 illustrates a sequence in which the data to be recorded in the flash memory system 20 shown in FIG. 1 is transmitted. FIG. 3 is a timing diagram illustrating a recording operation performed in each of the channel units CH1 and CH2 of the flash memory system 20 shown in FIG. 1.

The host 10 divides the to-be-recorded data into several pieces of page data of predetermined size and sequentially transmits the divided page data to the first and second channel units CH1 and CH2. Referring to FIG. 2, the to-be-recorded data is divided into several pieces of 8 Kbyte page data.

The transmitted page data pieces are sequentially stored in the first and second buffers 22 and 23 according to the sequence in which the page data pieces are transmitted. Then, the page data pieces stored in the first and second buffers 22 and 23 are input to the flash memory chips of the first and second channel units CH1 and CH2, respectively. More specifically, the control unit 24 instructs a writing command to a first flash memory chip 25 of the first channel unit CH1 and a third flash memory chip 27 of the second channel unit CH2. In response to the writing command, an address and first and second page data P1 and P2 stored in the first and second buffers 22 and 23 are loaded into page registers included in the first and third flash memory chips 25 and 27. This loading operation is referred to as a setup operation. The time required to perform the setup operation is referred to as a setup time.

After the setup operation with respect to the first and third flash memory chips 25 and 27 is completed, the control unit 24 instructs a programming command to the first and third flash memory chips 25 and 27 so that the page data P1 and P2 loaded in the page registers be programmed in memory cell arrays included in first and third flash memory chips 25 and 27. This process is referred to as a programming operation. The time required to perform the programming operation is referred to as a programming time.

Also, the control unit 24 instructs a writing command to a second flash memory chip 26 of the first channel unit CH1 and a fourth flash memory chip 28 of the second channel unit CH2 so that third and fourth page data P3 and P4 are loaded into page registers included in the second and fourth flash memory chips 26 and 28, respectively.

Then, the control unit 24 determines whether the programming operation with respect to the first and third flash memory chips 25 and 27, that is, the storage of the first and second page data P1 and P2 in the memory cell arrays, has been completed, using ready/busy (B/D) signals of the first and third flash memory chips 25 and 27. If it is determined that the programming operation has been completed, the control unit 24 instructs a writing command to the first and third flash memory chips 25 and 27 to load fifth and sixth page data P5 and P6 into the page registers included in the first and third flash memory chips 25 and 27.

However, in such a related art flash memory system, when there is a difference between the programming times of channels, a channel having a slower programming time affects a channel having a faster programming time. Referring to FIG. 3, when the programming time of each of the first and second flash memory chips 25 and 26 of the first channel unit CH1 is 200 µs, and the programming time of each of the third and fourth flash memory chips 27 and 28 of the second channel unit CH2 is 400 µs, the slower programming time of the flash memory chips of the second channel unit CH2 affects the faster programming time of the flash memory chips of the first channel unit CH1. In other words, a setup operation for the fifth page P5 that is performed after completion of the programming of the first page data P1 in the first flash memory chip 25 can actually occur after completion of the programming with respect to the third flash memory chip 27 of the second channel unit CH2 having a programming time slower than that of the first channel unit CH1. This is because the single control unit 24 controls both the programming operations with respect to the flash memory chips of the first and second channel units CH1 and CH2.

Hence, although the first channel unit CH1 having a faster programming time has completed a programming operation for page data, it cannot perform setup and programming operations for the next page data, and time blanks as indicated by reference symbols A and B are generated. Thus, the bandwidth cannot be sufficiently utilized.

As illustrated in FIG. 2, in the related art multi-channel flash memory system 20, to-be-recorded data is sequentially transmitted in such a way that the first page data P1 is allocated to the first channel unit CH1, the second page data P2 is allocated to the second channel unit CH2, the third page data P3 is allocated to the first channel unit CH1, and the fourth page data P4 is allocated to the second channel unit CH2. Accordingly, when the programming time of the first channel unit CH1 is different from that of the second channel unit CH2, one of the first and second channel units CH1 and CH2 that has a slower programming time affects the other one that has a faster programming time.

SUMMARY OF THE INVENTION

The present invention provides a multi-channel flash memory system including a plurality of flash memory chips, the system capable of increasing the bandwidth by considering the asynchronous characteristics caused by a difference between programming times of flash memory chips, a host system used to record data in the flash memory system, and a programming method and apparatus.

According to an aspect of the present invention, there is provided a flash memory system comprising: a plurality of channel units each comprising at least two flash memory chips, a control unit which controls the at least two flash memory chips, and a buffer unit which stores external data; and a host interface unit which transmits data separated according to the number of the channel units and transmitted by a host to the buffer units of the channel units, wherein the control unit records the data stored in the buffer unit into the flash memory chips.

According to another aspect of the present invention, there is provided a host system for programming a flash memory system, the host system comprising: a separation unit which determines a number of channel units of the flash memory system and divides to-be-recorded data into pieces of data of the same size according to the determined number of channel units; and a transmission unit which transmits the divided data to the flash memory system on a page-by-page basis, wherein each of the channel units comprises at least two flash memory chips, a control unit which controls the flash memory chips, and a buffer unit which stores external data.

According to another aspect of the present invention, there is provided a programming method performed in a flash memory system, the method comprising: dividing to-be-recorded data according to a number of channel units, each of which comprises at least two flash memory chips, a control unit for controlling the flash memory chips, and a buffer unit for storing external data, and transmitting the divided data; storing the divided and transmitted data in the buffer unit; and programming the data stored in the buffer unit into the flash memory chips according to an interleaving process so that the programming is independently performed for each of the channel units.

BRIEF DESCRIPTION OF THE DRAWINGS

The above and other features and aspects of the present invention will become more apparent by describing in detail exemplary embodiments thereof with reference to the attached drawings in which:

FIG. 11 is a flowchart illustrating a programming method performed in a flash memory device according to exemplary embodiments of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
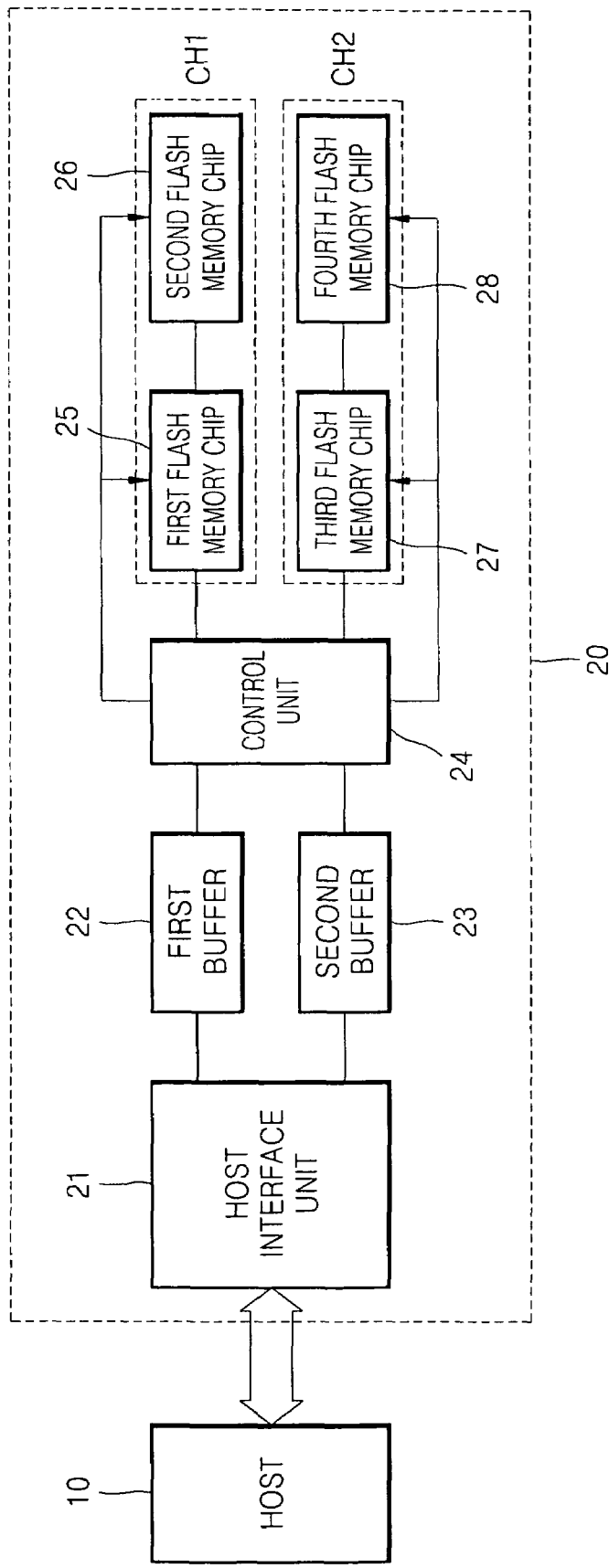
FIG. 1 is a block diagram of a configuration of a related art 2-channel flash memory system using a plurality of flash memory chips.
Figure 2:
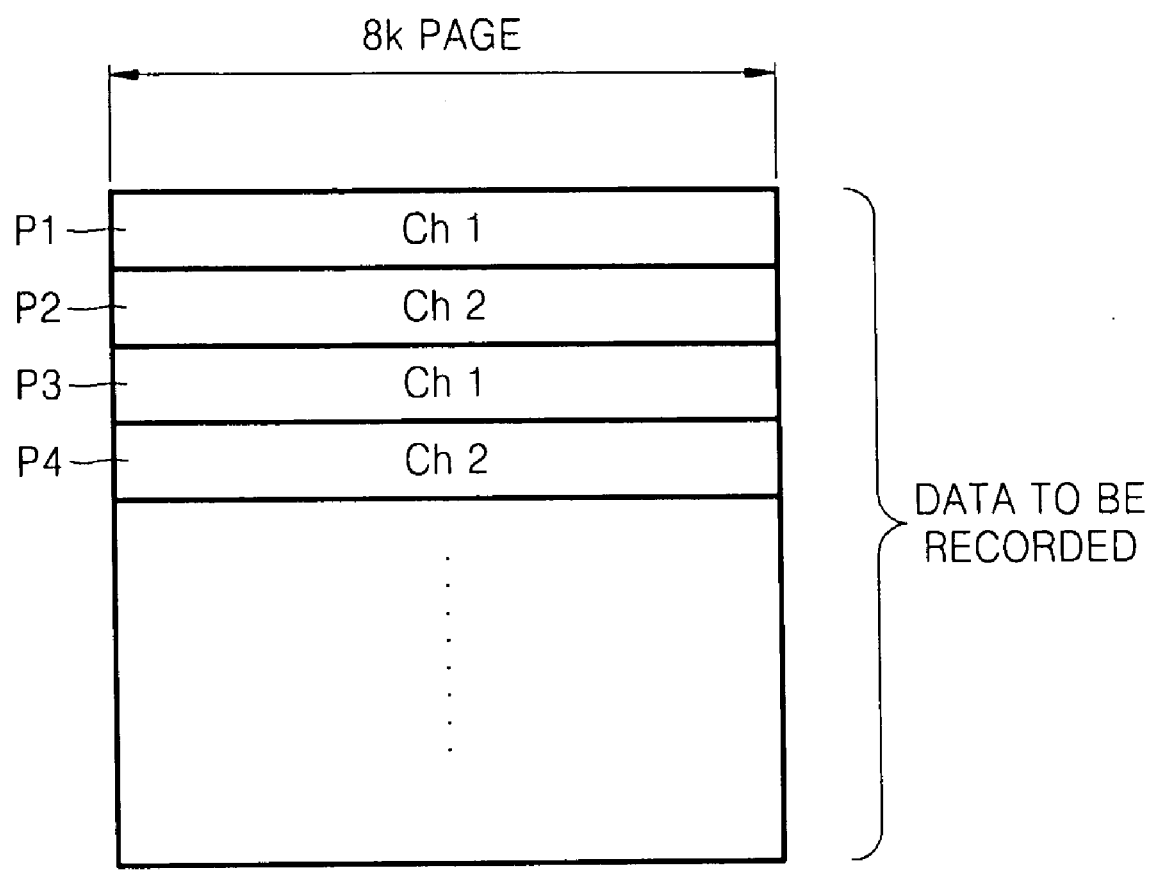
FIG. 2 illustrates a sequence in which data to be recorded in the flash memory system of FIG. 1 is transmitted.
Figure 3:
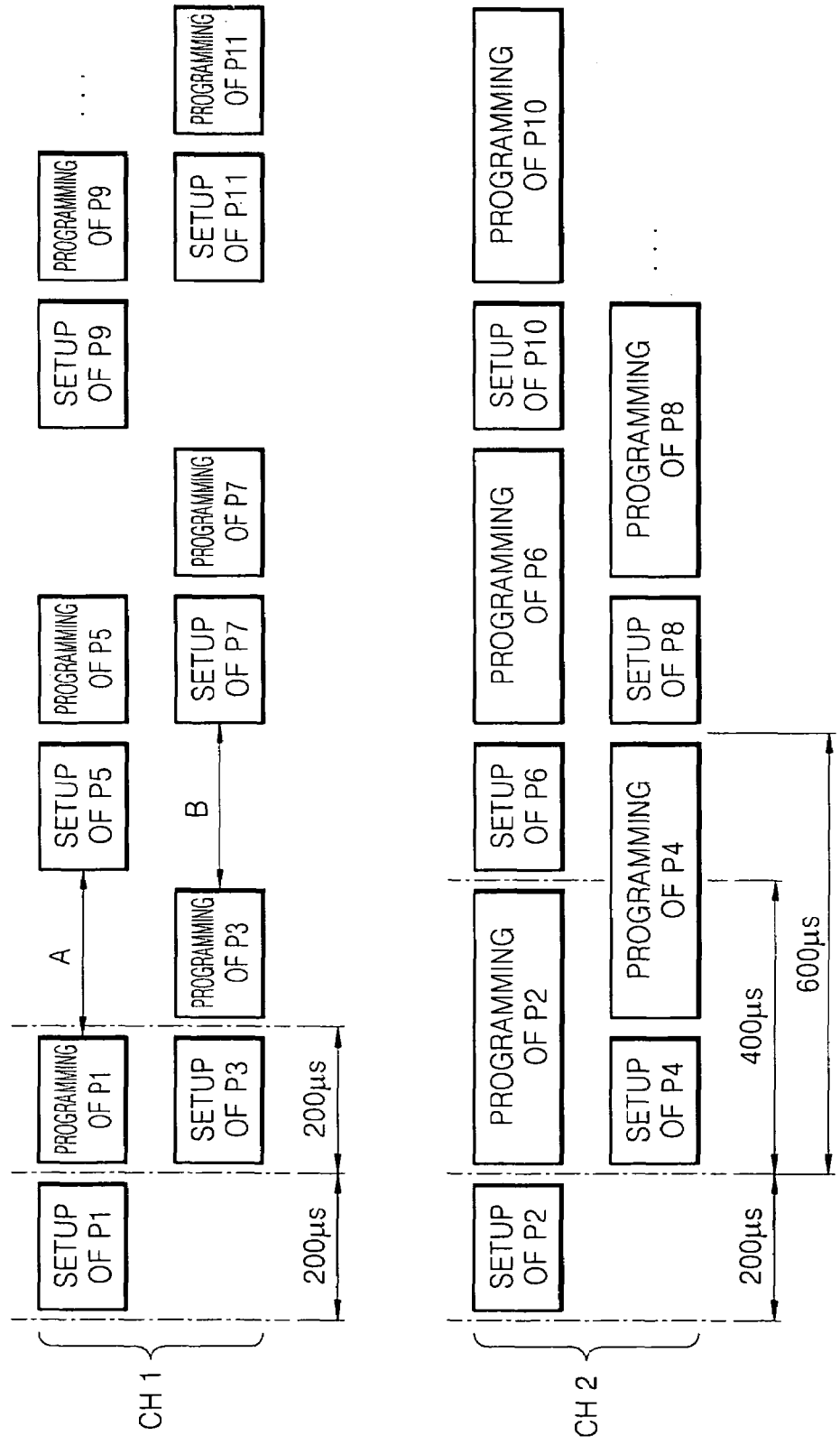
FIG. 3 is a timing diagram illustrating a recording operation performed in each channel unit of the flash memory system illustrated in FIG. 1.
Figure 4:
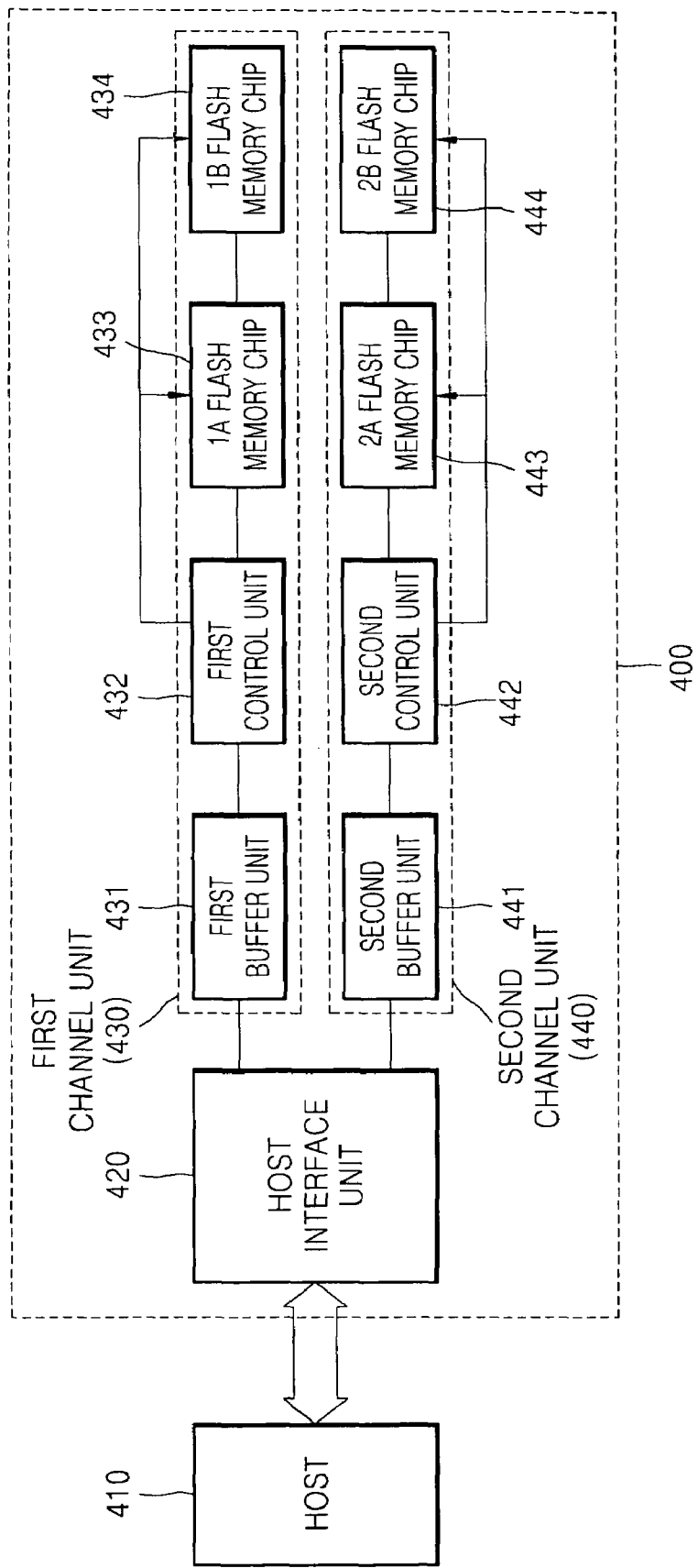
FIG. 4 is a block diagram of a flash memory system according to an exemplary embodiment of the present invention.

FIG. 4 is a block diagram of a flash memory system 400 according to an exemplary embodiment of the present invention. Referring to FIG. 4, the flash memory system 400 includes a host interface unit 420, a first buffer unit 431, a second buffer unit 441, a first control unit 432, a second control unit 442, and 4 flash memory chips 433, 434, 443, and 444. The first buffer unit 431, the first control unit 432, the 1A flash memory chip 433, and the 1B flash memory chip 434 constitute a first channel unit 430. The second buffer unit 441, the second control unit 442, the 2A flash memory chip 443, and the 2B flash memory chip 444 constitute a second channel unit 440.

The host interface unit 420 sequentially transmits page data received by means of communication with the host 410, to the first and second buffer units 431 and 441 according to the sequence in which the page data is transmitted by the host 410.

Figure 5:
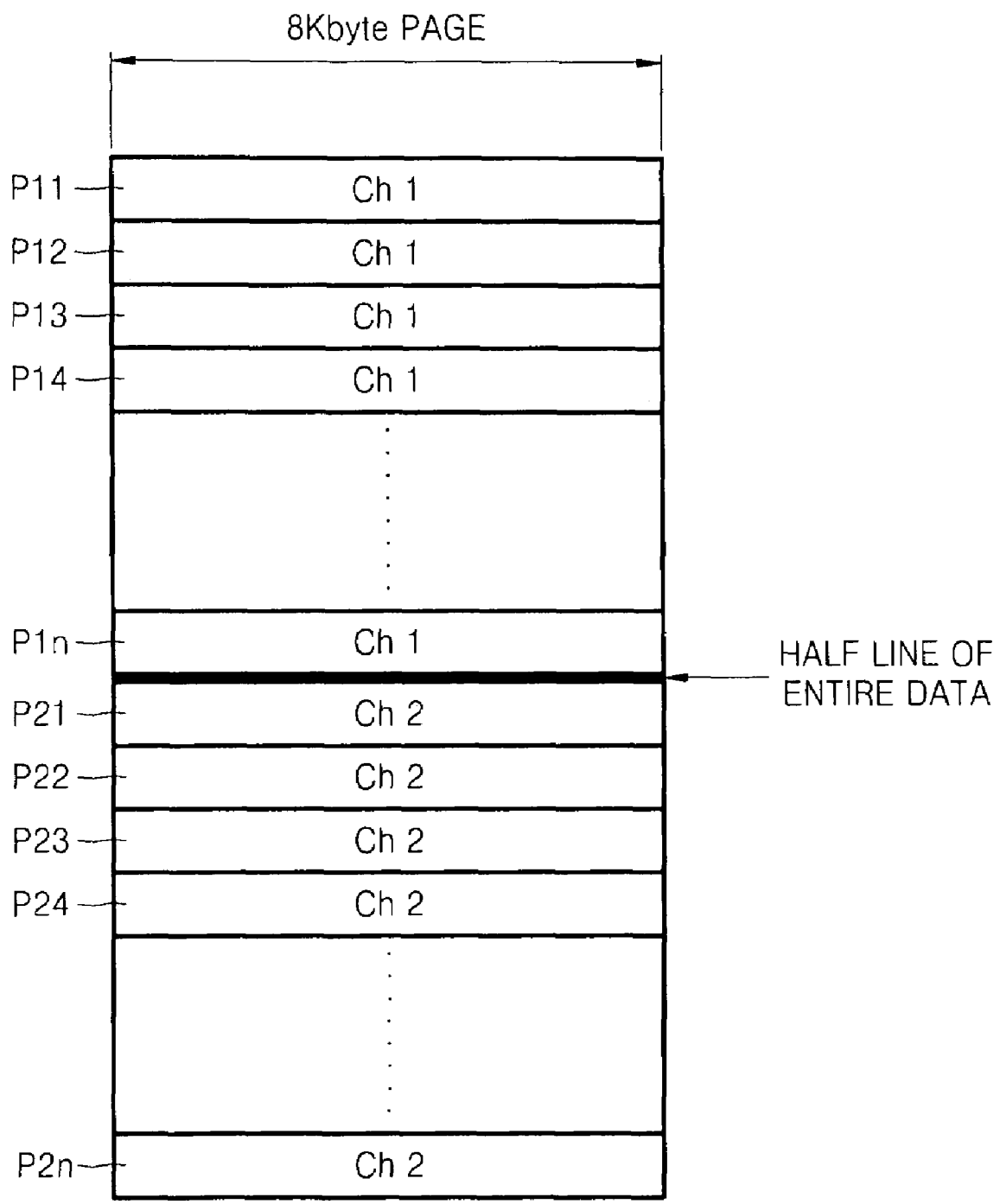
FIG. 5 illustrates a sequence in which data to be recorded in the flash memory system of FIG. 4 is transmitted.

The host 410 includes a separation unit (not shown) and a transmission unit (not shown). The separation unit determines the number of channel units included in the flash memory system 400 by means of communication with the host interface unit 420 and separates to-be-recorded data into pieces of data of identical size according to the determined number of channel units. The transmission unit transmits the separated data pieces to the flash memory system 400, which is connected thereto. More specifically, when the number of channel units included in the flash memory system 400 is n, the host 410 divides the to-be-recorded data into n pieces of data and transmits the n pieces of data in units of pages. For example, referring to FIG. 5, when predetermined data is to be recorded in the flash memory system 400 having two channels, the host 410 allocates one upper half of the to-be-recorded data to the first channel unit CH1 and the other lower half thereof to the second channel unit CH2 and transmits each of the two halves on a page-by-page basis. The host interface unit 420 sequentially transmits page data P11, P12, P13, P14, . . . , and P1n corresponding to the one upper half of the to-be-recorded data to the first buffer unit 431 and sequentially transmits page data P21, P22, P23, P24, . . . , and P2n corresponding to the other lower half of the to-be-recorded data to the second buffer unit 441. The size of page data may vary according to the physical characteristics of a flash memory system or a flash memory chip.

The number of pieces of page data transmitted to the first and second buffer units 431 and 441 may be equal to at least the number of flash memory chips included in the first and second channel units 430 and 440. In other words, when each of the first and second channel units 430 and 440 includes two flash memory chips as in the case of FIG. 4, at least two pieces of page data may be transmitted to each of the first and second buffer units 431 and 441 in order to perform a programming operation by applying an interleaving process between flash memory chips included in the same channel unit.

The first control unit 432 programs the first and second page data P11 and P12 stored in the first buffer unit 431 into the 1A and 1B flash memory chips 433 and 434 of the first channel unit 430 according to an interleaving process.

More specifically, the first control unit 432 transmits a writing command, address information, and the first page data stored in the first buffer unit 431 to the 1A flash memory chip 433. The first page data P11 is loaded into a page register included in the 1A flash memory chip 433. As described above, this loading operation is referred to as a setup operation. The time required to perform the setup operation is referred to as a setup time.

Next, the first control unit 432 instructs a programming command to the 1A flash memory chip 433 so that the first page data P11 loaded to the page register be programmed into a memory cell array. This process is referred to as a programming operation. The time required to perform the programming operation is referred to as a programming time.

The first control unit 432 instructs a writing command to the 1B flash memory chip 434 in conjunction with the instructing of the programming command to the 1A flash memory chip 433 so that the second page data P12 should be loaded to a page register included in the 1B flash memory chip 434. When the setup operation with respect to the 1B flash memory chip 434 is completed, the first control unit 432 instructs a programming command to the 1B flash memory chip 434 so that the second page data P12 loaded to the page register be programmed in a memory cell array of the 1B flash memory chip 434.

Next, the first control unit 432 determines whether the programming operation has been completed, using ready/busy (R/B) signals of the 1A and 1B flash memory chips 433 and 434, and sequentially programs the next page data of the upper half of the to-be-recorded data into the 1A and 1B flash memory chips 433 and 434 according to an interleaving process.

The second control unit 442 controls a setup operation and a programming operation in the same way as the first control unit 432 does, in order to record page data P21, P22, P23, P24, . . . , and P2n of the lower half of the to-be-recorded data stored in the second buffer unit 441.

Figure 6:
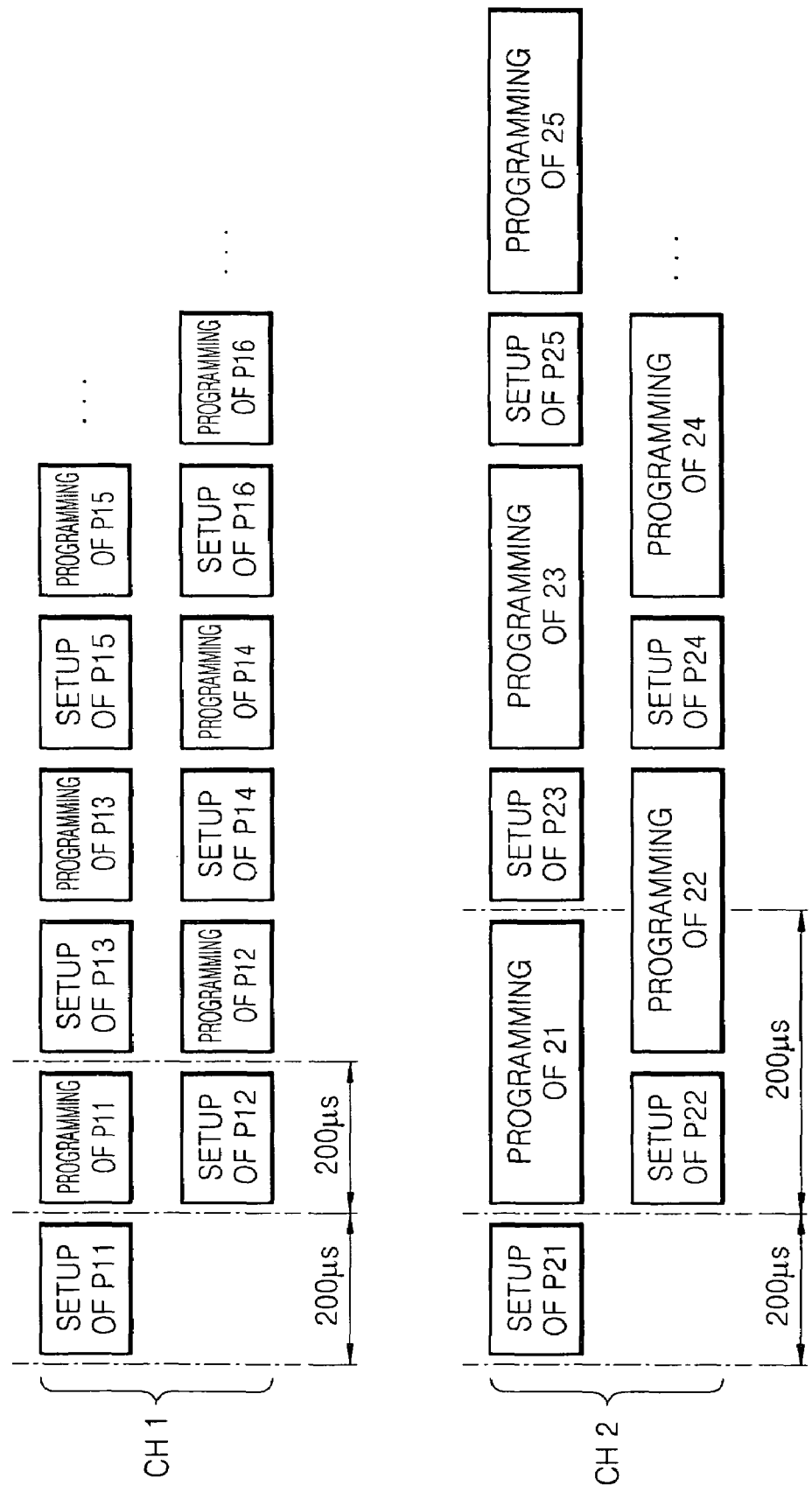
FIG. 6 is a timing diagram illustrating an operational state of each channel unit of the flash memory system illustrated in FIG. 4.

FIG. 6 is a timing diagram illustrating operational states of the first and second channel units CH1 and CH2 of the flash memory system 400.

The flash memory system 400 independently programs page data separately transmitted by the host 410 so that a channel unit having a slower programming time does not affect a programming operation of the other channel unit having a faster programming time. Referring to FIG. 6, when a setup time for the flash memory chips 433, 434, 443, and 444 included in the first and second channel units 430 and 440 is 200 µs, a programming time for the flash memory chips 433 and 434 of the first channel unit 430 is 200 µs, and a programming time for the flash memory chips 443 and 444 of the second channel unit 440 is 400 µs, the flash memory system 400 prevents the flash memory chips 443 and 444 of the second channel unit 440 from affecting the flash memory chips 433 and 434 of the first channel unit 430, by including the two control units 432 and 442 for the two channel units 430 and 440 in order to control independent programming operations with respect to the flash memory chips of the first and second channel units 430 and 440 to be performed according to an interleaving process. As described above, in order to perform an independent recording operation with respect to each channel, a host needs to divide to-be-recorded data into pieces of data and transmit corresponding divided data to each channel.

Figure 7:
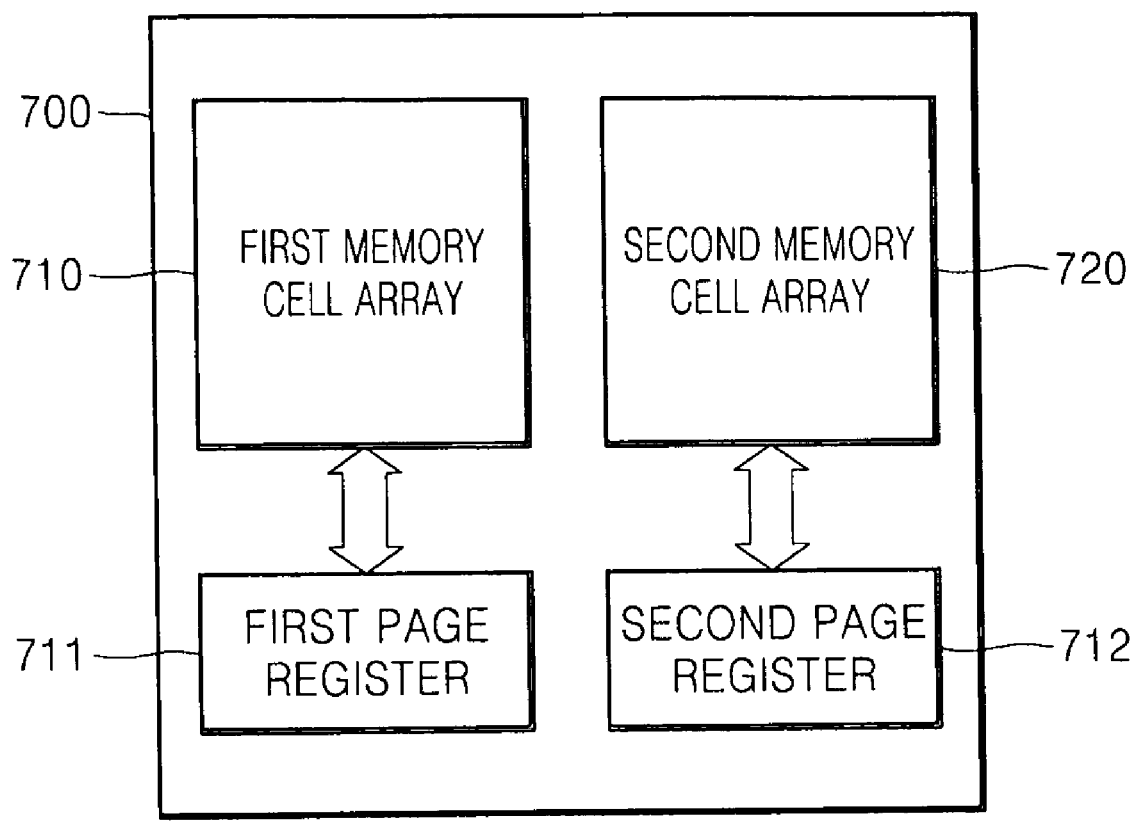
FIG. 7 is a block diagram schematically illustrating a configuration of each flash memory chip illustrated in FIG. 4.

FIG. 7 is a block diagram schematically illustrating a configuration of each of the flash memory chips 433, 434, 443, and 444 illustrated in FIG. 4. In FIG. 7, a flash memory chip 700 corresponds to each of the flash memory chips 433, 434, 443, and 444. Referring to FIG. 7, the flash memory chip 700 includes a first memory cell array 710, a second memory cell array 720, a first page register 711, and a second page register 712. Here, the number of memory cell arrays included in the flash memory chip 700 and the number of page registers corresponding to the number of memory cell arrays may be changed.

As described above, the first and second page registers 711 and 712 store the page data stored in the first and second buffer units 431 and 441, respectively, according to writing commands instructed by the control units 432 and 442, respectively. More specifically, a memory controller (not shown) of the flash memory chip 700 performs a setup operation of sequentially storing received page data in the first and second page registers 711 and 712 according to the writing commands of the control units 432 and 442 and then performs a programming operation of recording the page data stored in the first and second page registers 711 and 712 into the first and second memory cell arrays 710 and 720 all together according to programming commands of the control units 432 and 442.

The flash memory chip 700 may include a plurality of sub flash memory chips so as to perform a programming operation between internal chips according to an interleaving process. In this case, the sub flash memory chips may include a plurality of memory cell arrays and a plurality of page registers connected to the memory cell arrays.

Figure 8:
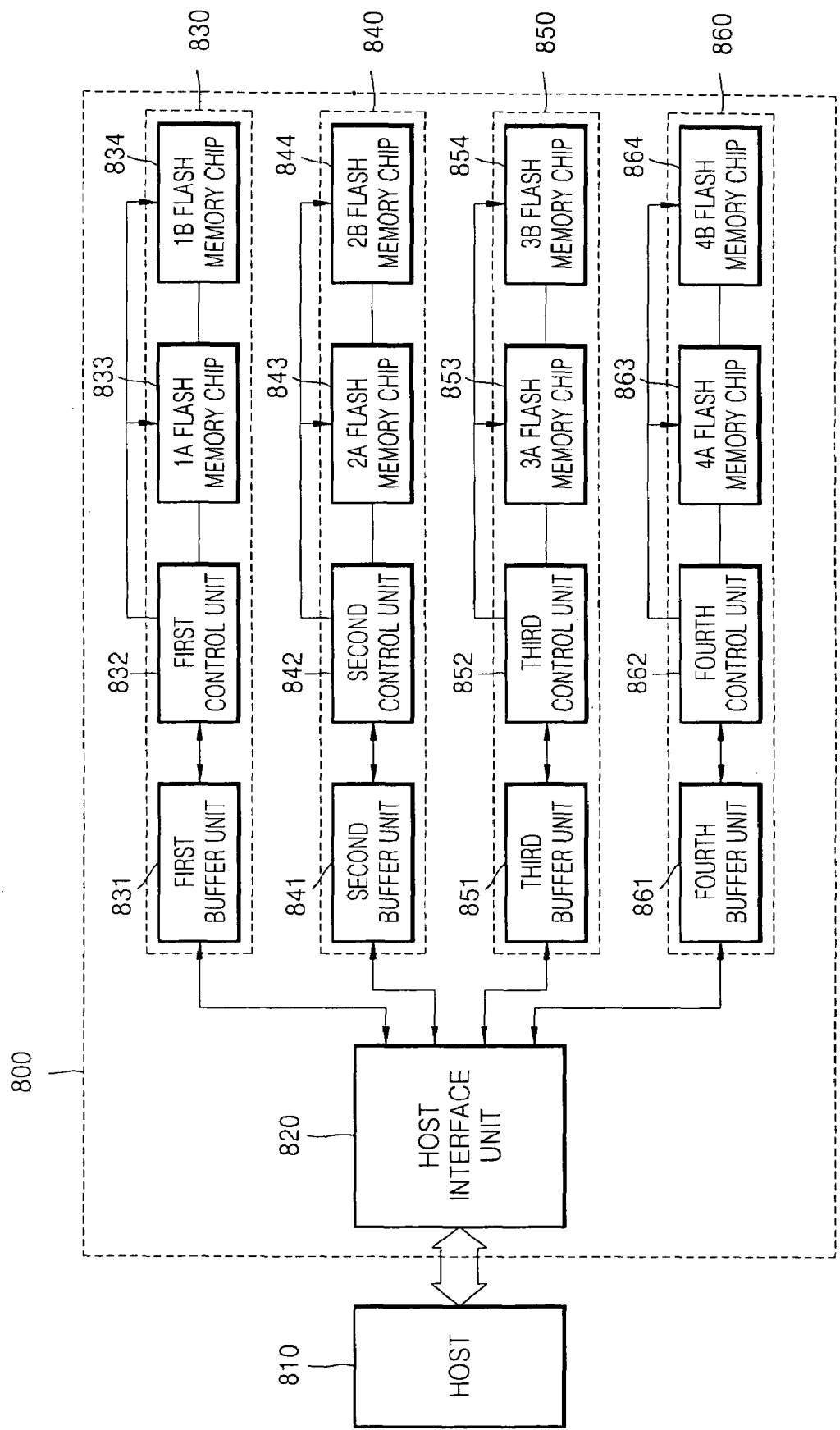
FIG. 8 is a block diagram of a flash memory system according to another exemplary embodiment of the present invention.
Figure 9:
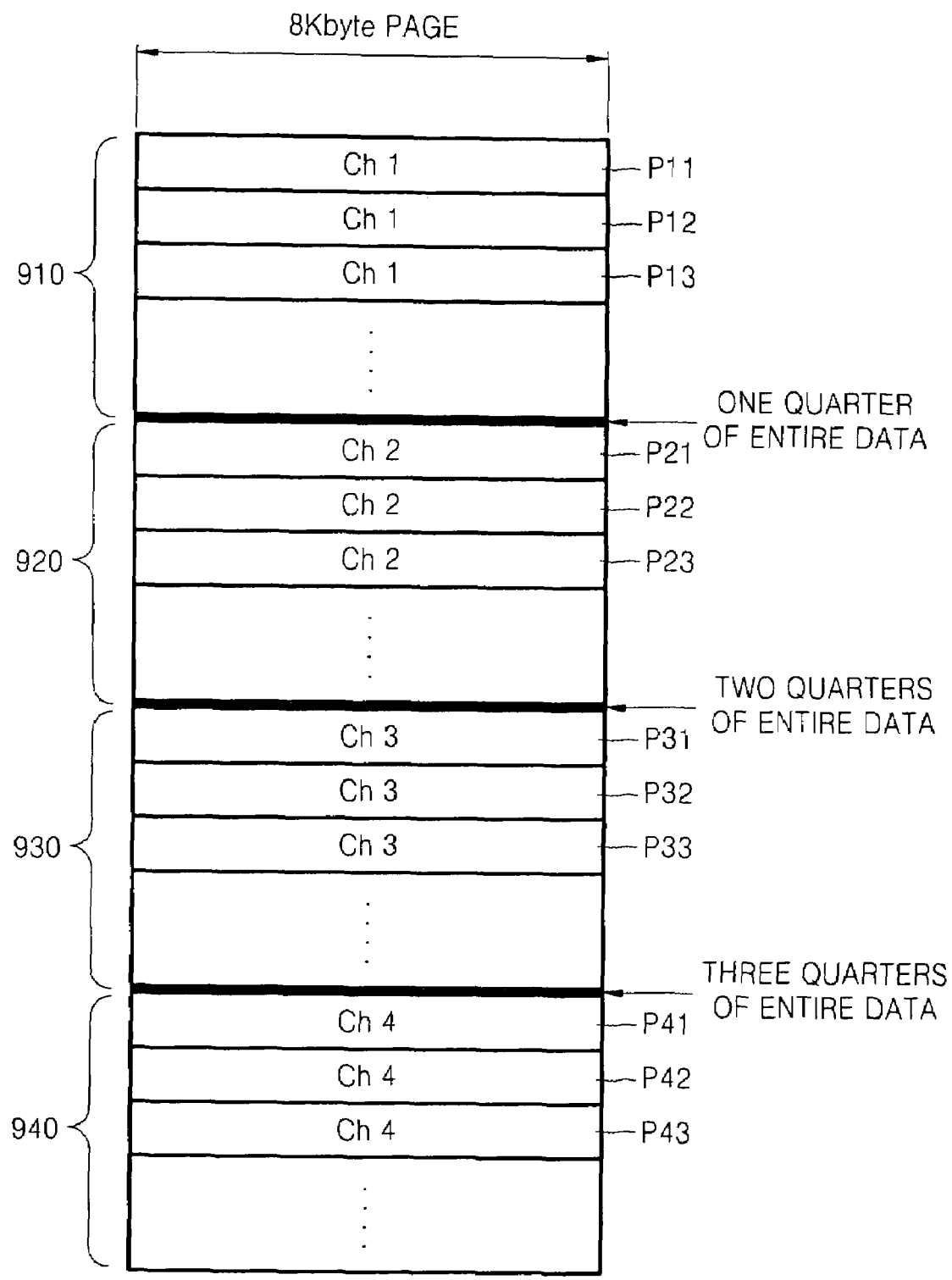
FIG. 9 illustrates a sequence in which data to be recorded in the flash memory system illustrated in FIG. 8 is transmitted.

FIG. 8 is a block diagram of a flash memory system 800 according to another exemplary embodiment of the present invention. FIG. 9 illustrates a sequence in which data to be recorded in the flash memory system 800 illustrated in FIG. 8 is transmitted.

The flash memory system 800 is similar to the flash memory system 400 of FIG. 4 except that four channel units 830, 840, 850, and 860 are included.

A host 810 determines the number of channel units included in the flash memory system 800 by means of communication with a host interface unit 820 and separates to-be-recorded data into pieces of data of identical size according to the determined number of channel units. For example, referring to FIG. 9, when predetermined data is to be recorded in the flash memory system 800, the host 810 divides to-be-recorded data into four pieces of data 910, 920, 930, and 940 and allocates the four data pieces 910, 920, 930, and 940 to channel units 830, 840, 850, and 860, respectively. The host interface unit 820 sequentially transmits the data piece 910 to a first buffer unit 831, the data piece 920 to a second buffer unit 841, the data piece 930 to a third buffer unit 851, and the data piece 940 to a fourth buffer unit 861. First, second, third, and fourth control units 832, 842, 852, and 862 program the to-be-recorded data separately transmitted according to the channel units and stored in the buffer units 831, 841, 851, and 861 into flash memory chips connected to the buffer units 831, 841, 851, and 861, according to an interleaving process.

Figure 10:
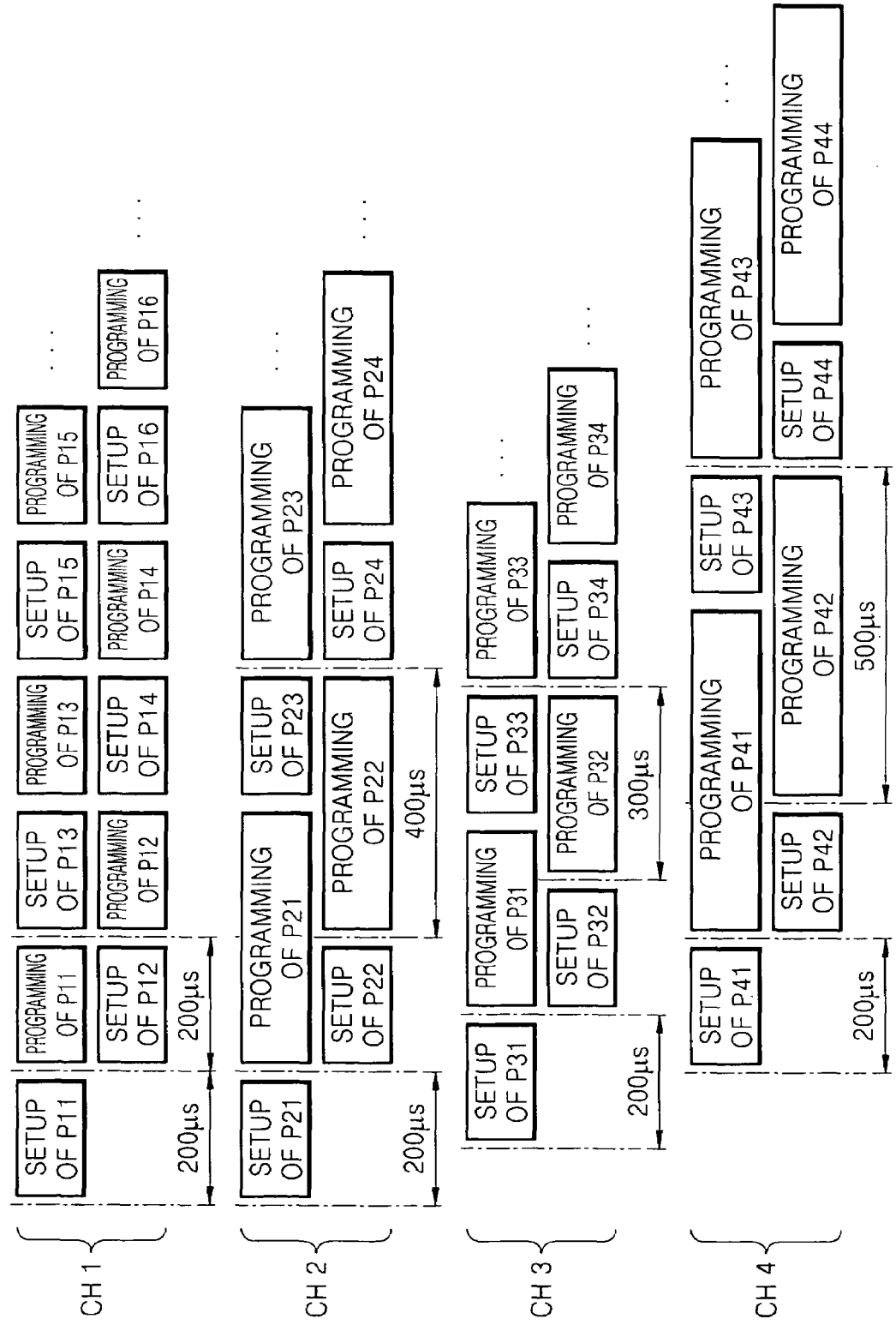
FIG. 10 is a timing diagram illustrating operational states of channel units of the flash memory system illustrated in FIG. 8.

FIG. 10 is a timing diagram illustrating operational states of the channel units 830, 840, 850, and 860 of the flash memory system 800 illustrated in FIG. 8. Referring to FIG. 10, the first, second, third, and fourth control units 832, 842, 852, and 862 control the channel units 830, 840, 850, and 860, respectively, to perform programming operations with respect to the flash memory chips included therein according to an interleaving process. Thus, an independent programming operation is performed in each channel unit without being affected by flash memory chips of a channel unit having a different programming time.

FIG. 11 is a flowchart illustrating a programming method performed in a flash memory device according to exemplary embodiments of the present invention.

Referring to FIG. 11, in operation 110, a host determines the number of channel units included in the flash memory device by means of communication with a host interface unit, separates to-be-recorded data into pieces of data of identical size according to the determined number of channel units, and transmits the separated data pieces to the channel units on a page-by-page basis. Each of the channel units denotes an independent storage path of the flash memory device that includes a control unit for controlling an independent programming operation, a plurality of flash memory chips, and a buffer unit for storing data separated and transmitted by the host.

In operation 1120, the host interface unit transmits the divided data to the buffer units of the channel units and stores the same therein.

In operation 1130, each of the control units controls page data included in a corresponding buffer unit to be programmed in the flash memory chips connected to the control unit according to an interleaving process.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to exemplary embodiments of the present invention as described above, a multi-channel flash memory system including a plurality of flash memory chips performs an independent programming operation with respect to the flash memory chips of each channel unit. Therefore, delay of the entire programming operation due to the difference between programming times of channel units can be prevented, and the bandwidth of the flash memory system can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flash memory system comprising:
    a plurality of channel units, each comprising at least two flash memory chips, a control unit which controls the at least two flash memory chips, and a buffer unit which stores data; and
    a host interface unit which transmits data separated into a plurality of contiguous pieces according to the number of the channel units and transmitted by a host to the buffer units of the channel units,
    wherein the control unit of each channel unit records the data stored in the buffer unit into the at least two flash memory chips according to an interleaving process independently with respect to each channel, and separated data included in each contiguous piece of to-be-recorded data is stored in the same channel unit, and
    wherein the control unit of each channel unit controls a setup operation with respect to one flash memory chip selected from the at least two flash memory chips in the same channel unit, and a programming operation with respect to the selected flash memory chip in conjunction with a setup operation with respect to a flash memory chip of the at least two flash memory chips other than the selected flash memory chip.

2. The flash memory system of claim 1, wherein in the setup operation with respect to one of the at least two flash memory chips, data stored in the buffer unit is loaded to a page register in the one of the flash memory chips.

3. The flash memory system of claim 1, wherein each of the flash memory chips comprises:
    a plurality of memory cell arrays; and a plurality of page registers connected to the plurality of memory cell arrays.

4. The flash memory system of claim 3, wherein the control unit controls a setup operation of sequentially recording the data stored in the buffer unit to the page registers to be performed and then instructs a programming command that the data stored in the page registers be programmed simultaneously in the memory cell arrays.

5. A programming method performed in a flash memory system, the method comprising:
    dividing to-be-recorded data into a plurality of contiguous pieces according to a number of channel units, each of which comprises at least two flash memory chips, a control unit for controlling the flash memory chips, and a buffer unit for storing external data, and transmitting the divided data;
    storing the divided and transmitted data in the buffer unit; and
    programming the data stored in the buffer unit into the flash memory chips according to an interleaving process independently with respect to each channel so that the programming is independently performed for each of the channel units, wherein the divided data included in each contiguous piece of to-be-recorded data is stored in the same channel unit, wherein the programming of the divided and transmitted data according to the interleaving process comprises:

performing a setup operation with respect to one selected from the at least two flash memory chips; and repeatedly performing a programming operation with respect to the selected flash memory chip and a setup operation with respect to a flash memory chip of the at least two flash memory chips other than the selected flash memory chip.

6. The programming method of claim 5, wherein in the setup operation with respect to one of the at least two flash memory chips, data stored in the buffer unit is loaded to a page register in the one flash memory chip.

7. The programming method of claim 5, wherein the programming of the divided and transmitted data according to the interleaving process comprises:

sequentially loading the divided and transmitted data to a plurality of page registers in each of the flash memory chips; and issuing a writing command to the page registers so that the data stored in the page registers are simultaneously programmed in memory cell arrays in the each flash memory chip.

8. The flash memory system of claim 1, wherein the data is separated into pieces of the same size.

9. The flash memory system of claim 1, wherein each contiguous piece is stored in a different buffer.

10. The flash memory system of claim 1, wherein the data is separated into a number of contiguous pieces equal to the number of channel units.

11. The flash memory system of claim 1, wherein the plurality of contiguous pieces are transmitted sequentially by the host to the buffer units of the channel units.

* * * * *